United States Patent
Awad Alla et al.

(10) Patent No.: US 11,285,814 B2
(45) Date of Patent: Mar. 29, 2022

(54) DISCHARGE TESTING OF VEHICLE BATTERIES

(71) Applicant: Ford Global Technologies, LLC, Dearborn, MI (US)

(72) Inventors: Michael Awad Alla, Novi, MI (US); David Celinske, Wolverine Lake, MI (US); Mathew Alan Boesch, Plymouth, MI (US); Sami Dagher, Dearborn, MI (US); Richard Dyche Anderson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 379 days.

(21) Appl. No.: 16/445,479

(22) Filed: Jun. 19, 2019

(65) Prior Publication Data

US 2020/0398671 A1    Dec. 24, 2020

(51) Int. Cl.
*B60L 3/00*    (2019.01)
*B60L 58/12*    (2019.01)

(52) U.S. Cl.
CPC ............. *B60L 3/0046* (2013.01); *B60L 58/12* (2019.02); *B60L 2210/10* (2013.01)

(58) Field of Classification Search
CPC ...... Y02T 90/16; Y02T 10/70; B60L 2260/32; B60L 58/20; B60L 50/15; B60L 2240/545; B60L 2210/10; B60L 3/0046; B60L 58/13
See application file for complete search history.

(56) References Cited

U.S. PATENT DOCUMENTS

| | | |
|---|---|---|
| 3,904,947 A | 9/1975 | Crews |
| 10,065,517 B1 | 9/2018 | Konrardy et al. |
| 2010/0006360 A1* | 1/2010 | Kishimoto ............... B60K 6/34 180/65.285 |
| 2015/0274027 A1* | 10/2015 | Crombez ................ B60L 58/20 701/22 |
| 2018/0029474 A1* | 2/2018 | Berels ...................... B60L 58/21 |
| 2019/0016312 A1 | 1/2019 | Carlson et al. |

FOREIGN PATENT DOCUMENTS

EP    0476405 A1    3/1992
WO    WO-2012077412 A1 *    6/2012    ............ H02J 7/0031

* cited by examiner

*Primary Examiner* — Jared Fureman
*Assistant Examiner* — Duc M Pham
(74) *Attorney, Agent, or Firm* — Frank A. MacKenzie; Bejin Bieneman PLC

(57) ABSTRACT

A system includes at least one load in a vehicle, a battery electrically connected to the load, a power source electrically connected to the load, and a computer communicatively connected to the power source. The computer is programmed to reduce a voltage supplied by the power source to the load so that the battery discharges to supply power to the load, and then, in response to an electrical quantity of the system being outside an electrical-quantity range while the battery is discharging, perform a minimal risk condition or prevent the vehicle from movably operating.

20 Claims, 9 Drawing Sheets

DISCHARGE TESTING OF VEHICLE BATTERIES

BACKGROUND

Vehicles can include propulsion to generate energy and translate the energy into motion of the vehicle. Types of propulsions include a conventional powertrain including an internal-combustion engine coupled to a transmission that transfers rotational motion to wheels; an electric powertrain including high-voltage batteries, an electric motor, and a transmission that transfers rotational motion to the wheels; and a hybrid powertrain including elements of the conventional powertrain and the electric powertrain. Vehicles of any propulsion type typically also include low-voltage batteries.

In normal operation, electrical loads are typically powered by the engine and/or the high-voltage batteries without drawing power from the low-voltage batteries. The low-voltage batteries supply power in the event of transient demands from the loads for greater power than the engine and/or high-voltage batteries can supply. Occasionally electrical faults such as short circuits occur, which can increase demand on the low-voltage batteries.

DETAILED DESCRIPTION

Figure 1:
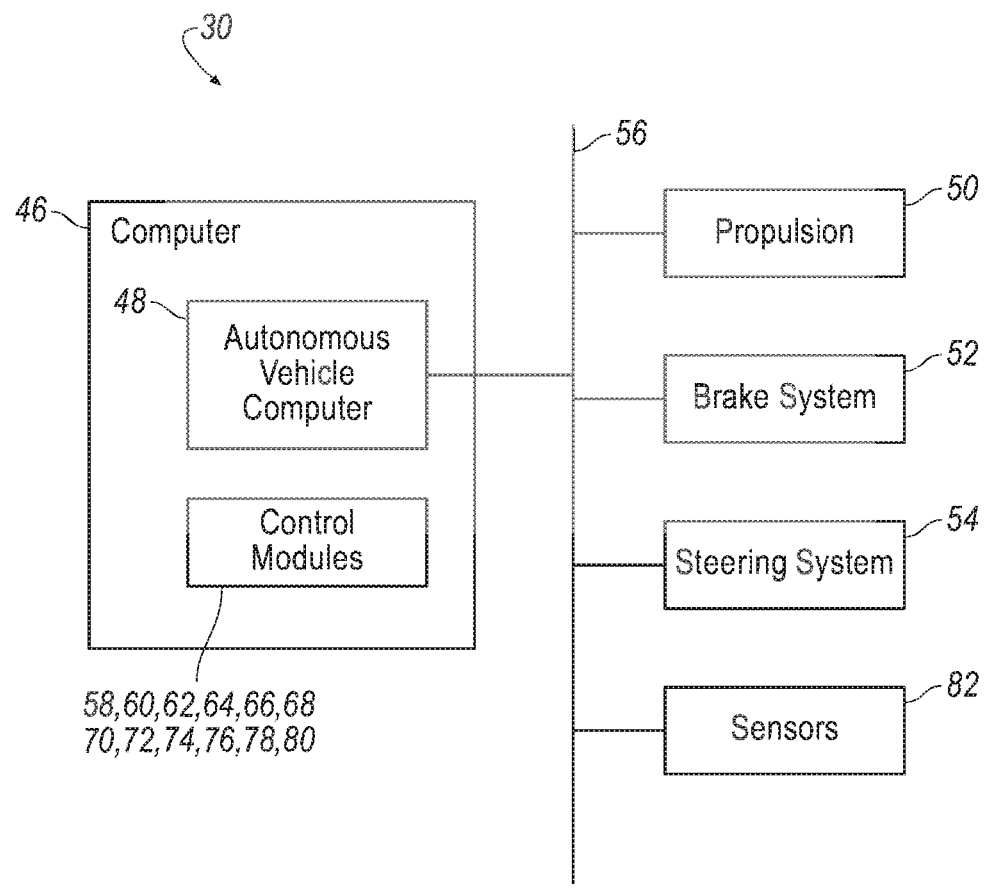
FIG. 1 is a block diagram of an example vehicle.

The system described herein can provide a robust way to test and monitor batteries of a vehicle, specifically, whether the batteries are capable of holding a sufficient charge to perform a minimal risk condition (described below). If the capacity of the batteries has diminished, the system can either prevent the vehicle from operating or can perform a minimal risk condition while the vehicle has the energy to do so.

The system includes a load in a vehicle, a battery electrically connected to the load, a power source electrically connected to the load, and a computer communicatively connected to the power source. The computer is programmed to reduce a voltage supplied by the power source to the load so that the battery discharges to supply power to the load; and then, in response to an electrical quantity of the system being outside an electrical-quantity range while the battery is discharging, perform a minimal risk condition or prevent the vehicle from movably operating.

The battery may be a low-voltage battery.

The power source may be a DC/DC converter supplied by a high-voltage battery.

The electrical quantity may be one of a voltage of the load or a voltage of the battery.

The computer may be further programmed to, while the vehicle is movably operating, perform a minimal risk condition in response to a state of charge (SoC) of the battery falling below a SoC threshold. The computer may be further programmed to reduce the voltage supplied by the power source so that the state of charge of the battery falls below the SoC threshold. The computer may be further programmed to reduce the voltage supplied by the power source only while the vehicle is not movably operating.

The computer may be further programmed to reduce the voltage supplied by the power source until the discharge by the battery is greater than a charge to perform the minimal risk condition.

The computer may be further programmed to reduce the voltage supplied by the power source until the state of charge of the battery is at a level above the SoC threshold. The computer may be further programmed to reduce the voltage supplied by the power source periodically.

The computer may be further programmed to reduce the voltage supplied by the power source while the vehicle is movably operating. The computer may be further programmed to while the vehicle is not movably operating, reduce a voltage supplied by the power source to the load so that the battery discharges to supply power to the load so that the state of charge of the battery falls below the SoC threshold; and then, in response to the electrical quantity of the system being outside the electrical-quantity range while the battery is discharging, prevent the vehicle from movably operating.

The load may be a first load, the electrical quantity may be a voltage of the first load, the electrical-quantity range may be a first voltage range, the system may further include a second load electrically connected to the battery and to the power source, and the computer may be further programmed to, after reducing the voltage supplied by the power source, in response to a voltage of the second load being outside a second voltage range while the battery is discharging, perform a minimal risk condition or prevent the vehicle from movably operating.

A system includes a load in a vehicle, a battery electrically connected to the load, means to control power supplied to the load, and means to one of perform a minimal risk condition or prevent the vehicle from movably operating in response to an electrical quantity of the system being outside an electrical-quantity range while the battery is supplying power to the load due to a reduced voltage from the means to supply power to the load.

A computer include a processor and a memory storing instructions executable by the processor to reduce a voltage supplied by a power source to a load so that a battery discharges to supply power to the load; and then, in response to an electrical quantity of one of the battery or the load being outside an electrical-quantity range while the battery is discharging, prevent a vehicle from movably operating or perform a minimal risk condition. The instructions may further include instructions to, while the vehicle is movably operating, perform a minimal risk condition in response to a state of charge of the battery falling below a SoC threshold. The instructions may further include instructions to reduce the voltage supplied by the power source until the state of charge of the battery falls below the SoC threshold. The instructions may further include instructions to reduce the voltage supplied by the power source only while the vehicle is not movably operating.

The instructions may further include instructions to reduce the voltage supplied by the power source until the state of charge of the battery is at a level above the SoC threshold. The instructions may further include instructions to reduce the voltage supplied by the power source periodically.

A system 32 includes at least one load 34 in a vehicle 30, a battery 36, 38 electrically connected to the load 34, a power source 36, 40, 42, 44 electrically connected to the load 34, and a controller 46 communicatively connected to the power source 36, 40, 42, 44. The controller 46 is programmed to reduce a voltage supplied by the power source 36, 40, 42, 44 to the load 34 so that the battery 36, 38 discharges to supply power to the load 34, and then, in response to an electrical quantity of the system 32 being outside an electrical-quantity range while the battery 36, 38 is discharging, perform a minimal risk condition or prevent the vehicle 30 from movably operating.

For purposes of this disclosure, "minimal risk condition" has the meaning accorded by the National Highway Traffic Safety Administration (NHTSA) and the Society of Automotive Engineers (SAE): "'Minimal risk condition' means low-risk operating condition that an automated driving system automatically resorts to either when a system fails or when the human driver fails to respond appropriately to a request to take over the dynamic driving task." (U.S. Dept. of Transportation & NHTSA, *Automated Driving Systems 2.0: A Vision for Safety*, at 26 (citing SAE International J3016, International Taxonomy and Definitions for Terms Related to Driving Automation Systems for On-Road Motor Vehicles (J3016:September 2016)).) For example, the minimal risk condition may be initiating a handover to the human driver or autonomously driving the vehicle 30 to a halt at a roadside, i.e., stopping the vehicle 30 outside active lanes of traffic.

With reference to FIG. 1, the vehicle 30 may be an autonomous or semi-autonomous vehicle. An autonomous-vehicle controller 48 can be programmed to operate the vehicle 30 independently of the intervention of a human driver, completely or to a lesser degree. The autonomous-vehicle controller 48 may be programmed to operate a propulsion 50, brake system 52, steering system 54, and/or other vehicle systems based on data provided by sensors 82. For the purposes of this disclosure, autonomous operation means the autonomous-vehicle controller 48 controls the propulsion 50, brake system 52, and steering system 54 without input from a human driver; semi-autonomous operation means the autonomous-vehicle controller 48 controls one or two of the propulsion 50, brake system 52, and steering system 54 and a human driver controls the remainder; and nonautonomous operation means a human driver controls the propulsion 50, brake system 52, and steering system 54.

The autonomous-vehicle controller 48 is a microprocessor-based computer. The autonomous-vehicle controller 48 includes a processor, memory, etc. The autonomous-vehicle controller 48 can be a single controller or multiple controllers. The memory of the autonomous-vehicle controller 48 includes memory for storing instructions executable by the processor as well as for electronically storing data and/or databases.

The controller 46 is one or more microprocessor-based computers. The controller 46 includes memory, at least one processor, etc. The memory of the controller 46 includes memory for storing instructions executable by the processor as well as for electronically storing data and/or databases. The controller 46 may be the same controller as the autonomous-vehicle controller 48, or the controller 46 may be one or more separate controllers in communication with the autonomous-vehicle controller 48 via a communications network 56, or the controller 46 may encompass multiple controllers including the autonomous-vehicle controller 48. As a separate controller, the controller 46 may be or include, e.g., one or more electronic control units or modules (ECU or ECM) such as a hybrid-powertrain control module 58 and/or a battery-energy control module 60. Other ECMs 58-80 may include a body control module 62, an antilock-brake control module 64, a first power-steering control module 66, a second power-steering control module 68, a collision-mitigation-system control module 70, an autonomous-vehicle platform-interface control module 72, an engine control module 74, an object-detection maintenance control module 76, a restraint control module 78, and an accessory control module 80 (shown in FIGS. 3A-C).

The controller 46 may transmit and receive data through the communications network 56, which may be a controller area network (CAN) bus, Ethernet, WiFi, Local Interconnect Network (LIN), onboard diagnostics connector (OBD-II), and/or by any other wired or wireless communications network. The controller 46 may be communicatively coupled to the autonomous-vehicle controller 48, the other ECMs 58-80, the propulsion 50, the brake system 52, the steering system 54, the sensors 82, the power source 36, 40, 42, 44, and other components via the communications network 56.

The sensors 82 may provide data about operation of the vehicle 30, for example, wheel speed, wheel orientation, and engine and transmission data (e.g., temperature, fuel consumption, etc.). The sensors 82 may detect the location and/or orientation of the vehicle 30. For example, the sensors 82 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 82 may detect the external world, e.g., objects and/or characteristics of surroundings of the vehicle 30, such as other vehicles, road lane markings, traffic lights and/or signs, pedestrians, etc. For example, the sensors 82 may include radar sensors, scanning laser range finders, light detection and ranging (LIDAR) devices, and image processing sensors such as cameras. The sensors 82 may include communications devices, for example, vehicle-to-infrastructure (V2I) or vehicle-to-vehicle (V2V) devices.

Figure 2:
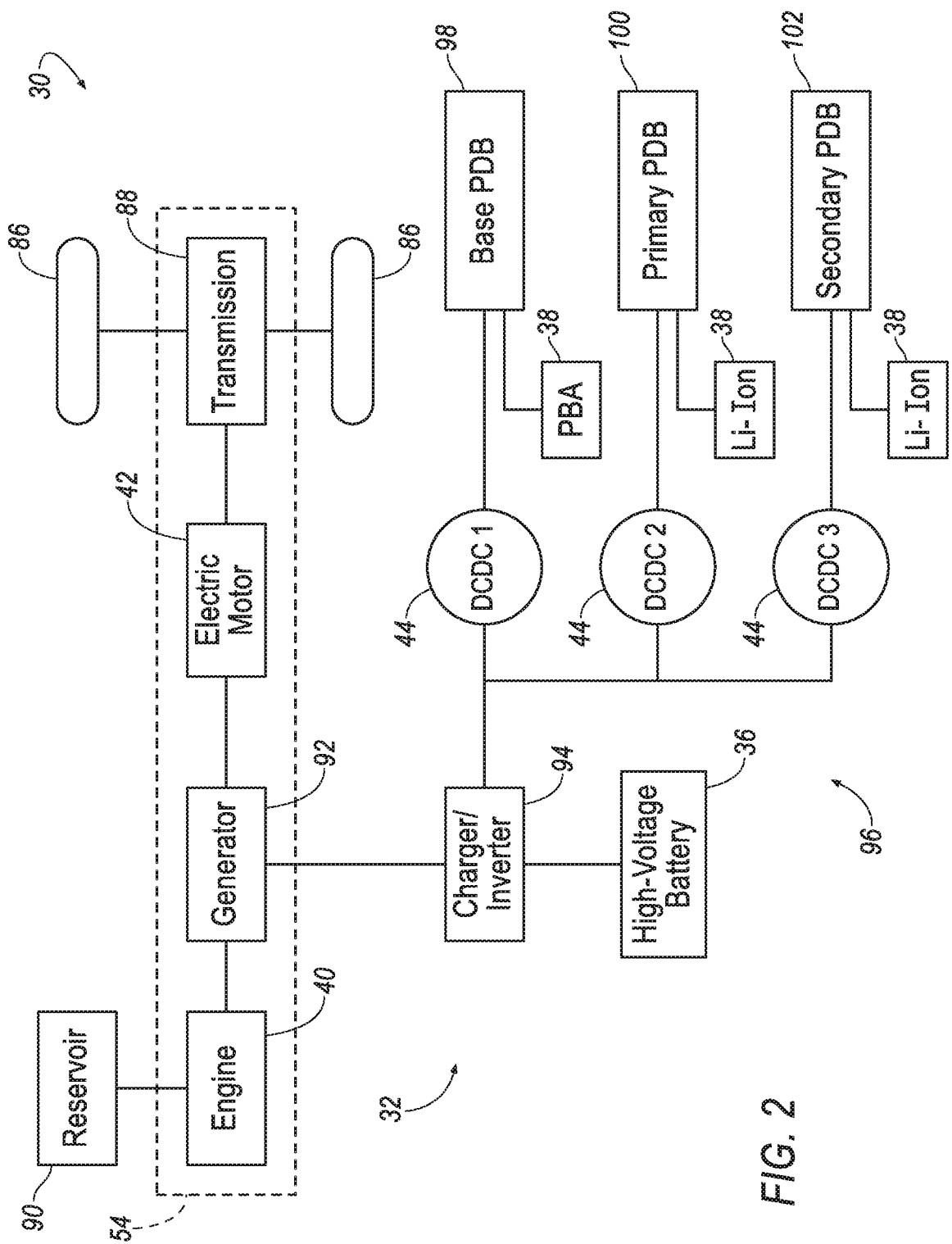
FIG. 2 is a block diagram of an example propulsion system of the vehicle of FIG. 1.

The propulsion 50 of the vehicle 30 generates energy and translates the energy into motion of the vehicle 30. As shown in FIG. 2, the propulsion 50 may be hybrid propulsion. The propulsion 50 may include a powertrain 84 in any hybrid arrangement, e.g., a series-hybrid powertrain (as shown in FIG. 2), a parallel-hybrid powertrain, a power-split (series-parallel) hybrid powertrain, etc. The propulsion 50 is described in more detail below with respect to FIG. 2. Alternatively, the propulsion 50 can be a plug-in hybrid propulsion or a battery electric propulsion. The propulsion 50 can include an electronic control unit (ECU) or the like, e.g., the hybrid-powertrain control module 58, that is in communication with and receives input from the autonomous-vehicle controller 48 and/or a human driver. The human driver may control the propulsion 50 via, e.g., an accelerator pedal and/or a gear-shift lever.

The brake system 52 is typically a conventional vehicle braking subsystem and resists the motion of the vehicle 30 to thereby slow and/or stop the vehicle 30. The brake system 52 may include friction brakes such as disc brakes, drum brakes, band brakes, etc.; regenerative brakes; any other suitable type of brakes; or a combination. The brake system 52 can include an electronic control unit (ECU) or the like, e.g., the antilock-brake control module 64, that is in communication with and receives input from the autonomous-vehicle controller 48 and/or a human driver. The human driver may control the brake system 52 via, e.g., a brake pedal.

The steering system 54 is typically a conventional vehicle steering subsystem and controls the turning of wheels 86. The steering system 54 may be a rack-and-pinion system with electric power-assisted steering, a steer-by-wire system, as both are known, or any other suitable system. The steering system 54 can include an electronic control unit (ECU) or the like, e.g., the first and/or second power-steering control modules 66, 68, that is in communication with and receives input from the autonomous-vehicle controller 48 and/or a human driver. The human driver may control the steering system 54 via, e.g., a steering wheel.

With reference to FIG. 2, the propulsion 50 includes the powertrain 84 that transmits power from an engine 40, from a high-voltage battery 36, or from both the engine 40 and the high-voltage battery 36, through an electric motor 42 to a transmission 88 and ultimately to the wheels 86 of the vehicle 30. The engine 40 is an internal-combustion engine and may contain cylinders that serve as combustion chambers that convert fuel from a reservoir 90 to rotational kinetic energy. A generator 92 may receive the rotational kinetic energy from the engine 40. The generator 92 converts the rotational kinetic energy into electricity, e.g., alternating current, and powers the electric motor 42. A charger/inverter 94 may convert the output of the generator 92, e.g., the alternating current, into high-voltage direct current to supply the high-voltage battery 36 and a power-distribution system 96. For the purposes of this disclosure, "high voltage" is defined as at least 60 volts direct current or at least 30 volts alternating current. For example, the high-voltage direct current may be on the order of 400 volts. The charger/inverter 94 controls how much power is supplied from the high-voltage battery 36 to the generator 92 of the powertrain 84. The electric motor 42 may convert the electricity from the generator 92 into rotational kinetic energy transmitted to the transmission 88. The transmission 88 transmits the kinetic energy via, e.g., a drive axle to the wheels 86, while applying a gear ratio allowing different tradeoffs between torque and rotational speed.

The high-voltage battery 36 produces a voltage of at least 60 volts direct current, e.g., on the order of 300 volts direct current. The high-voltage battery 36 may be any type suitable for providing high-voltage electricity for operating the vehicle 30, e.g., lithium-ion, nickel-metal hydride, lead-acid, etc. The high-voltage battery 36 is electrically coupled to the powertrain 84 via the charger/inverter 94.

Figure 3A:
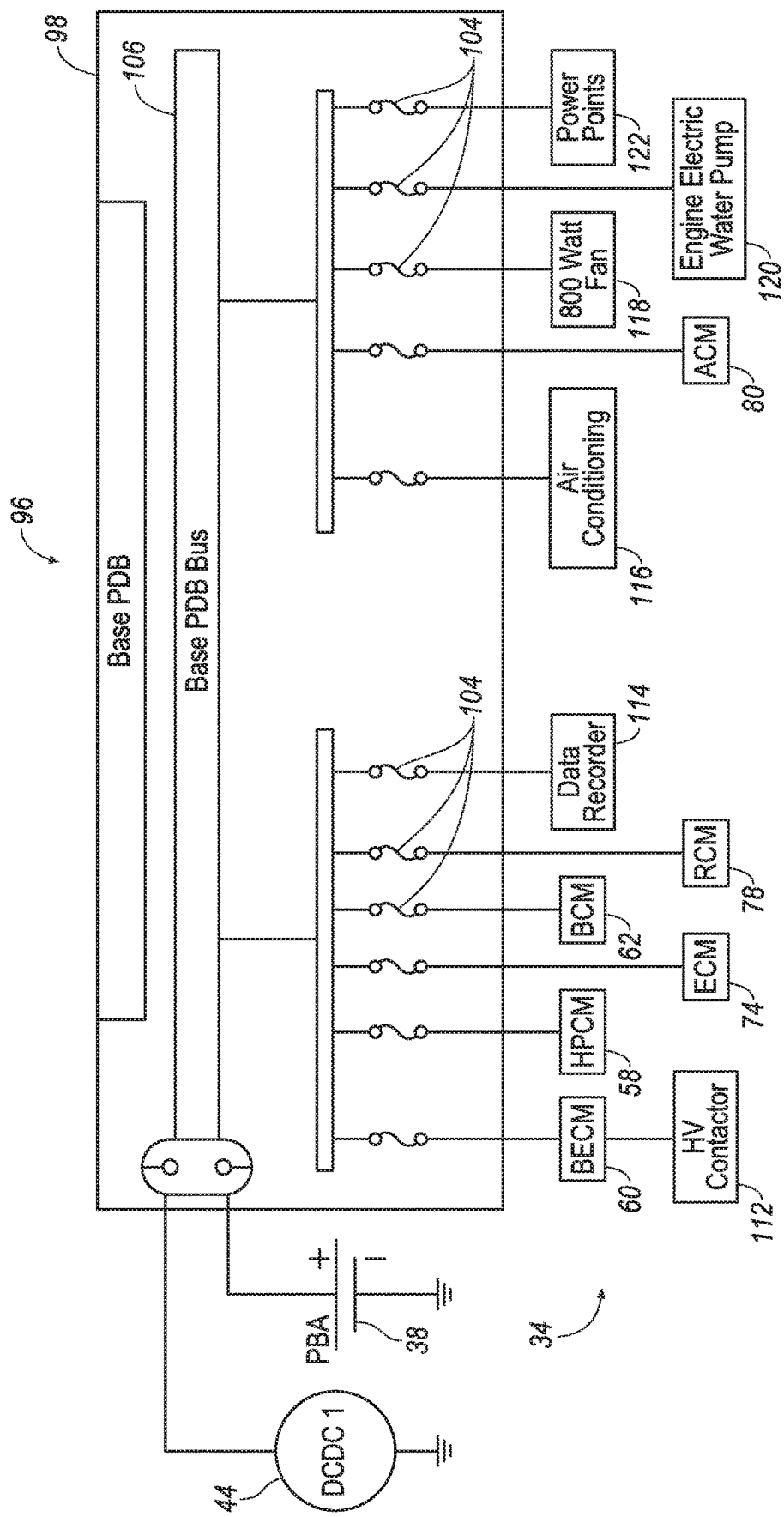
FIGS. 3A-C are circuit diagrams of an example power-distribution system of the vehicle of FIG. 1.
Figure 3B:
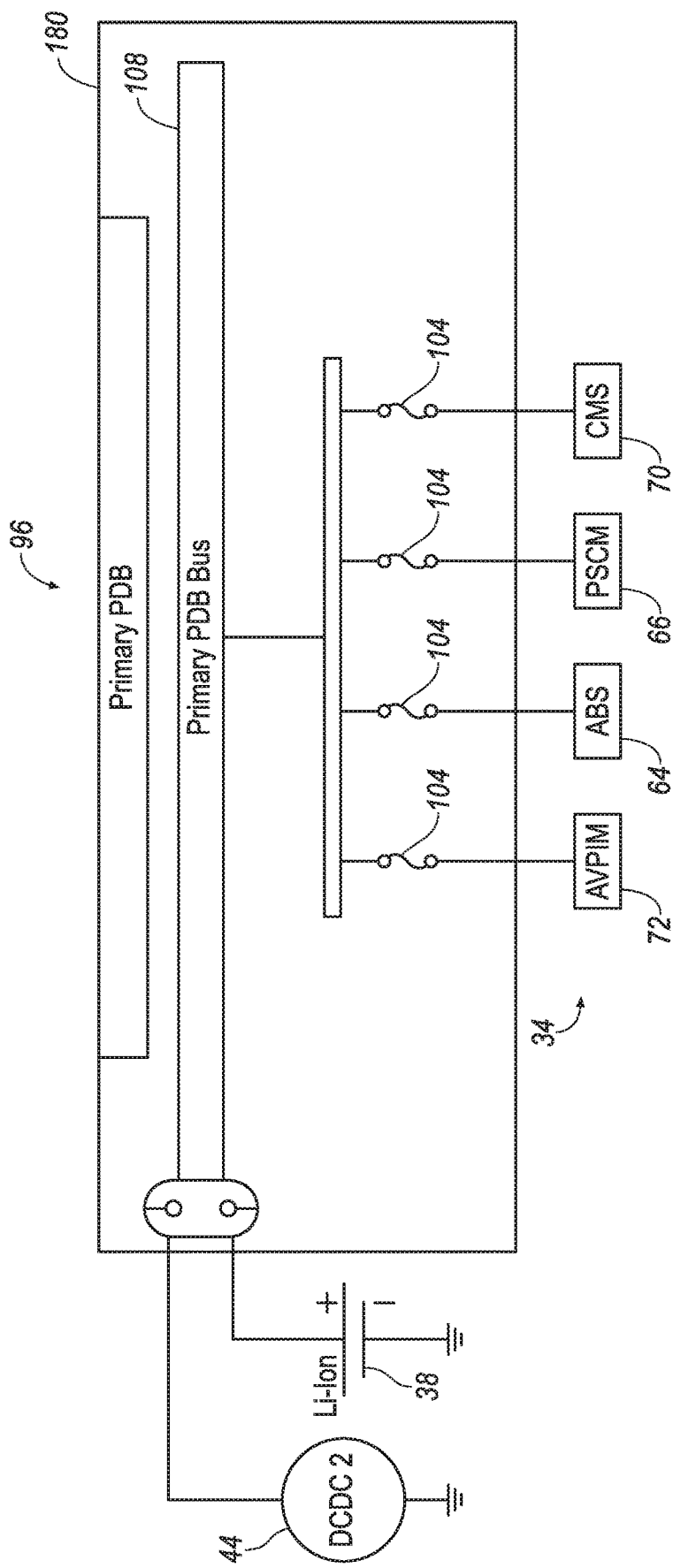
Figure 3C:
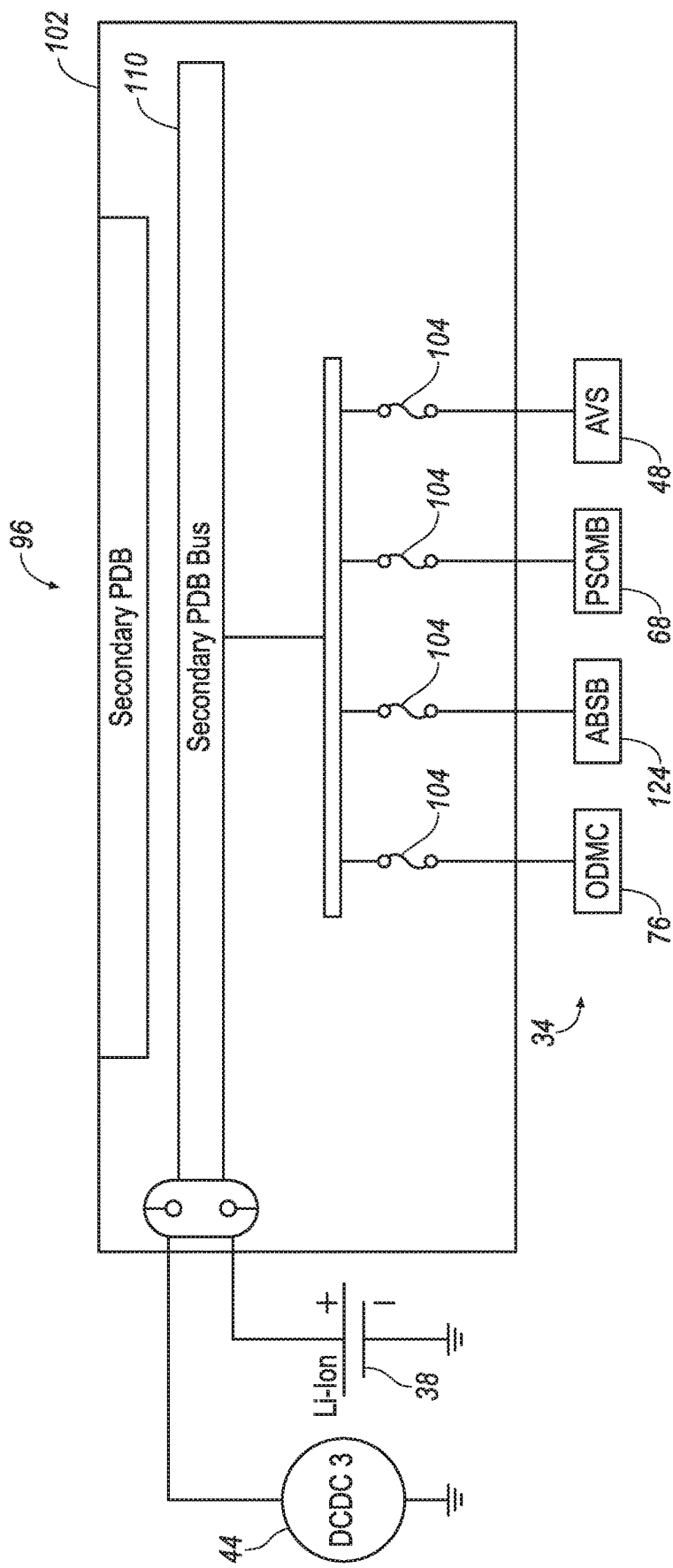

With reference to FIGS. 3A-C, the power-distribution system 96 may include a plurality of DC/DC converters 44. As shown in the example hybrid of FIG. 2, the DC/DC converters 44 are electrically coupled to the powertrain 84 via the charger/inverter 94 (as shown in FIG. 2) and to the low-voltage batteries 38. The DC/DC converters 44 may receive high-voltage direct current from the high-voltage battery 36 and/or from the engine 40 or electric motor 42 and convert the high-voltage direct current to low-voltage direct current; in general, for the hybrid arrangement as shown in FIG. 2 and for other arrangements of the propulsion 50, the DC/DC converters 44 convert high-voltage current from a high-voltage bus to low-voltage current for a low-voltage bus. For the purposes of this disclosure, "low voltage" is defined as less than 60 volts direct current or less than 30 volts alternating current. For example, the low-voltage direct current may be 12 volts or 48 volts. Each DC/DC converter 44 may exchange the low-voltage direct current with one of the low-voltage batteries 38, and each DC/DC converter 44 may supply the low-voltage direct current to one of a plurality of power-distribution-board buses 106, 108, 110.

A plurality of power-distribution boards 98, 100, 102 include a base power-distribution board 98, a primary power-distribution board 100, and a secondary power-distribution board 102. The power-distribution boards 98, 100, 102 divide electricity into subsidiary circuits, i.e., a plurality of loads 34. The power-distribution boards 98, 100, 102 each include one of the power-distribution-board buses 106, 108, 110 and one or more fuses 104. The power-distribution-board buses 106, 108, 110 include a base power-distribution-board bus 106 in the base power-distribution board 98, a primary power-distribution-board bus 108 in the primary power-distribution board 100, and a secondary power-distribution-board bus 110 in the secondary power-distribution board 102.

Each low-voltage battery 38 each produces a voltage less than 60 volts direct current, e.g., 12 or 48 volts direct current. The low-voltage batteries 38 may be any type suitable for providing low-voltage electricity for power the loads 34, e.g., lithium-ion, lead-acid, etc. For example, the low-voltage battery 38 electrically coupled to the base power-distribution board 98 is a lead-acid battery, and the low-voltage batteries 38 electrically coupled to the primary power-distribution board 100 and to the secondary power-distribution board 102 are lithium-ion batteries. The low-voltage batteries 38 are electrically coupled to the powertrain 84 via the respective DC/DC converter 44 and the charger/inverter 94.

The loads 34 may include, e.g., the battery-energy control module 60; a high-voltage contactor 112 for the battery-energy control module 60 to control electricity flow to the DC/DC converters 44, etc.; the hybrid-powertrain control module 58; the engine control module 74; the body control module 62; the restraint control module 78; a data recorder 114; an air-conditioning system 116 or components or settings of the air-conditioning system 116 such as an AC fan or a high-speed mode; the accessory control module 80; a fan 118 for cooling the engine 40; an electric water pump 120 for the engine 40; power points 122 (i.e., sockets in a passenger cabin for passengers to plug in personal devices) (as all shown in FIG. 3A); the autonomous-vehicle platform-interface control module 72; the antilock-brake control module 64; the first power-steering control module 66; the collision-mitigation-system control module 70 (as all shown in FIG. 3B); the object-detection maintenance control module 76; an antilock-brake-system backup 124; the second power-steering control module 68; and the autonomous-vehicle controller 48 (as all shown in FIG. 3C).

In normal operation, the loads 34 are typically powered via the DC/DC converters 44 without drawing power from the low-voltage batteries 38. The low-voltage batteries 38 supply power in the event of transient demands from the loads 34 for greater power than the DC/DC converters 44 can supply. The power source 36, 40, 42, 44 can be the high-voltage battery 36; the engine 40; the electric motor 42; or the DC/DC converters 44, which are supplied by the high-voltage battery 36, engine 40, and/or electric motor 42. The power source 36, 40, 42, 44 is electrically connected to the loads 34. The battery 36, 38 can be the high-voltage battery 36 and/or the low-voltage batteries 38, in particular, the low-voltage batteries 38. The power source 36, 40, 42, 44 and the battery 36, 38 are separate components.

The low-voltage batteries 38 each have a state of charge that can vary between 0% (no remaining charge) and 100%

(fully charged). The state of charge can be measured by various sensors monitoring the low-voltage batteries 38 (not shown) in communication with the controller 46. For example, the sensors can infer the state of charge from the current flowing through the low-voltage battery 38 and from the temperature of the low-voltage battery 38 using known relationships. The state of charge can alternatively be measured in units of electrical charge, e.g., ampere-hours. The state of charge as a percentage is equal to the state of charge in units of charge divided by a capacity of the low-voltage battery 38. The capacity of a battery is a maximum quantity of charge that the battery can store.

Figure 4:
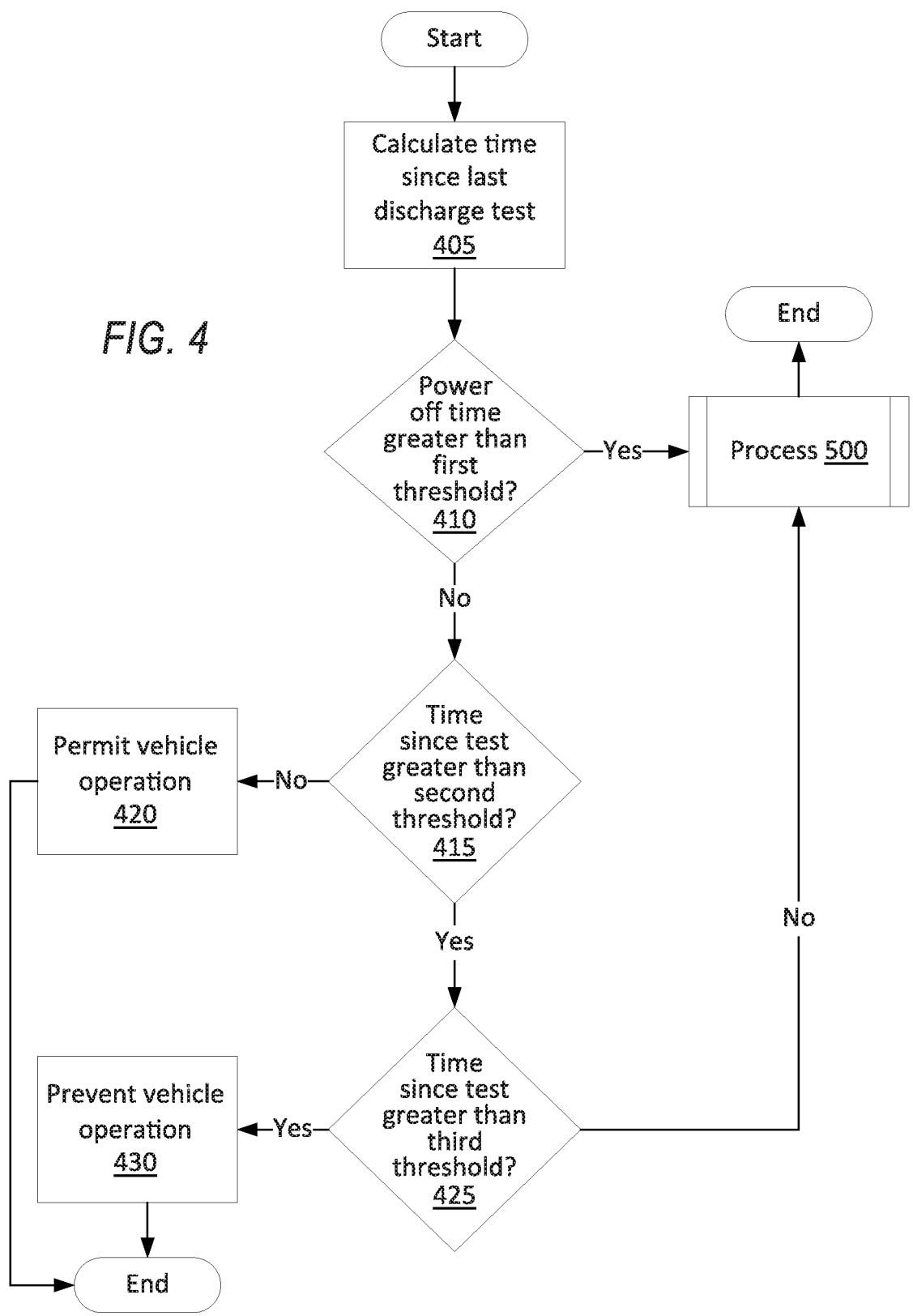
FIG. 4 is a process flow diagram of an example process for determining whether to perform a pre-drive discharge test of a battery of the power-distribution system.

FIG. 4 is a process flow diagram illustrating an exemplary process 400 for determining whether to perform a pre-drive discharge test of a battery 36, 38 of the power-distribution system 96 (described below as a process 500). The memory of the controller 46 stores executable instructions for performing the steps of the process 400. As a general overview of the process 400, the controller 46 performs the pre-drive discharge test if the time that the power has been off for the vehicle 30 is greater than a first threshold or if the time since the previous pre-drive discharge test is between a second threshold and a third threshold.

The process 400 occurs while the vehicle 30 is not movably operating. The process 400 can occur at a time when the vehicle 30 will be operated soon. For example, the process 400 can occur at a preprogrammed time of day based on a regular schedule for operating the vehicle 30, or can occur in response to receiving a message designating a time to perform the process 400 or a time when the vehicle 30 will be operated.

The process 400 begins in a block 405, in which the controller 46 calculates the time elapsed since the most recent pre-drive discharge test. The time at which the pre-drive discharge test was completed can be stored in the memory of the controller 46 (described below with respect to a block 570), and the controller 46 can subtract the stored time from a current time.

Next, in a decision block 410, the controller 46 determines whether the time that the vehicle 30 has been in a power-off state is greater than the first threshold. The first threshold can be chosen to balance inconvenience and energy usage of performing the pre-drive discharge test with the likelihood of catching a fault that has arisen since the vehicle 30 was previously operated. For example, the first threshold can be 6 hours. If the time in the power-off state is greater than the first threshold, then the controller 46 performs the process 500 (described below) and then ends the process 400. If the time in the power-off state is less than the threshold, then the process 400 proceeds to a decision block 415.

In the decision block 415, the controller 46 determines whether the time elapsed since the most recent pre-drive discharge test is greater than a second threshold. The second threshold can be chosen to prevent the vehicle 30 from going too long without performing the pre-drive discharge test even if operated frequently. For example, the second threshold can be 22 hours. If the time elapsed since the most recent pre-drive discharge test is greater than the second threshold, then the process 400 proceeds to a decision block 425. If the time elapsed since the most recent pre-drive discharge test is less than the second threshold, then the process 400 proceeds to a block 420.

In the block 420, the controller 46 permits the vehicle 30 to be movably operated without performing the pre-drive discharge test. After the block 420, the process 400 ends.

In the decision block 425, the controller 46 determines whether the time elapsed since the most recent pre-drive discharge test is greater than a third threshold. The third threshold can be chosen to be sufficiently long that an error may have occurred to cause the pre-drive discharge test to not be performed. For example, the third threshold can be 46 hours. If the time elapsed since the most recent pre-drive discharge test is less than the third threshold, then the controller 46 performs the process 500 (described below) and then ends the process 400. If the time elapsed since the most recent pre-drive discharge test is greater than the third threshold, then the process 400 proceeds to a block 430.

In the block 430, the controller 46 sets a diagnostic trouble code and prevents the vehicle 30 from movably operating. After the block 430, the process 400 ends.

Figure 5:
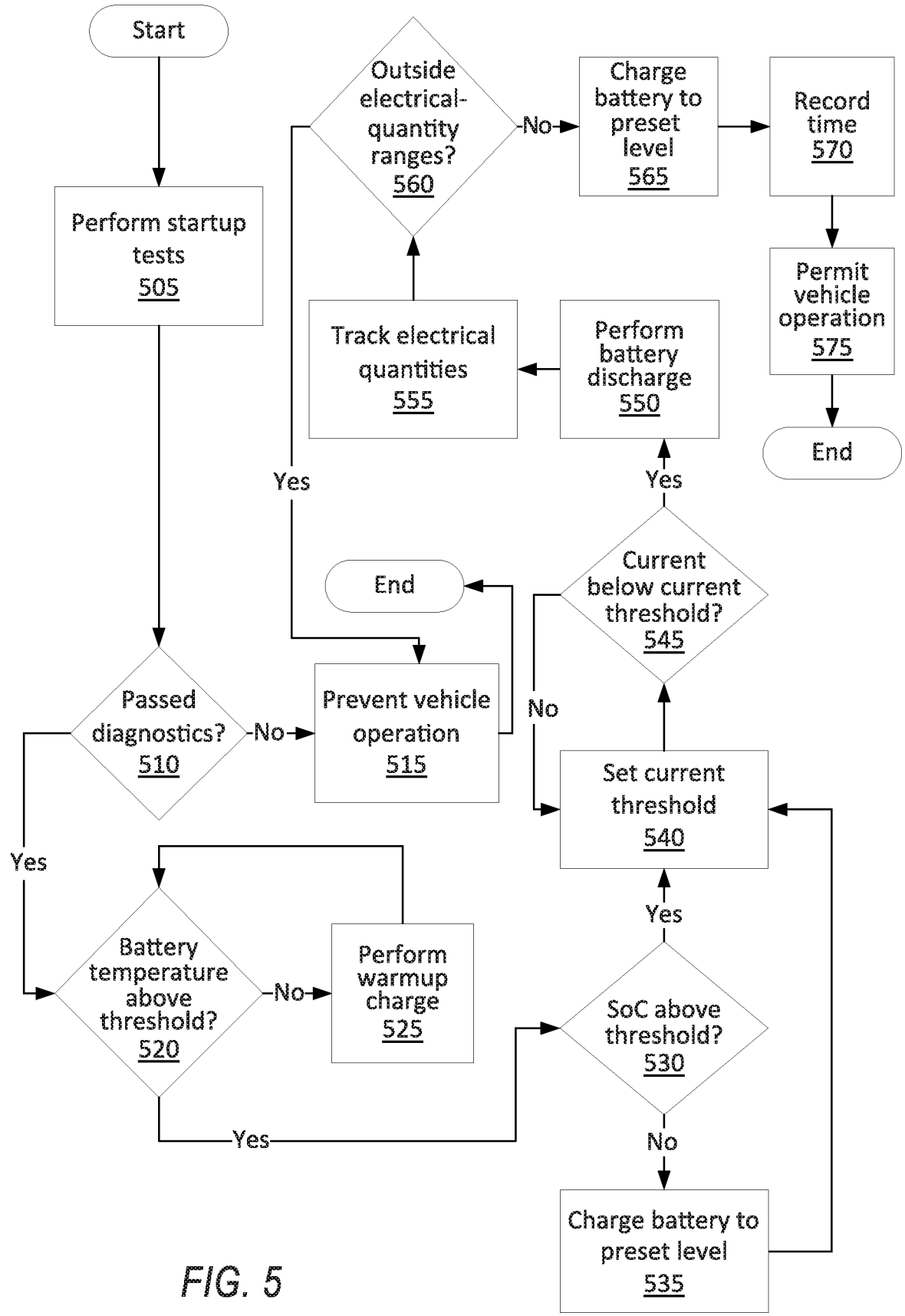
FIG. 5 is a process flow diagram of an example process for performing the pre-drive discharge test of the battery.

FIG. 5 is a process flow diagram illustrating an exemplary process 500 for performing a pre-drive discharge test of a battery 36, 38 of the power-distribution system 96. The memory of the controller 46 stores executable instructions for performing the steps of the process 500. As a general overview of the process 500, the controller 46 performs various checks; if the checks are acceptable, tracks electrical quantities of the system 32 while reducing a voltage supplied by the power source 36, 40, 42, 44 to the loads 34 so that the battery 36, 38 discharges to supply power to the loads 34; and permits or prevents the vehicle 30 from movably operating in response to the relationship of the electrical quantities to electrical-quantity ranges. The controller 46 reduces the voltage supplied by the power source 36, 40, 42, 44 until the discharge of the battery 36, 38 is greater than a charge to perform the minimal risk condition.

The process 500 occurs while the vehicle 30 is not movably operating. For example, the process 500 can occur as a result of the process 400 above, can occur at a preprogrammed time of day based on a regular schedule for operating the vehicle 30, or can occur in response to receiving a message designating a time to perform the process 500 or a time when the vehicle 30 will be operated.

The process 500 can be performed for all the low-voltage batteries 38 or for a subset of the low-voltage batteries 38, such as for the lithium-ion low-voltage batteries 38 connected to the primary power-distribution board 100 and the secondary power-distribution board 102 but not the lead-acid low-voltage battery 38 connected to the base power-distribution board 98. For example, the process 500 can be performed for a subset of the low-voltage batteries 38 if the loads 34 necessary to perform a minimal risk condition are arranged on a subset of the power-distribution boards 98, 100, 102. The process 500 is performed independently for each low-voltage battery 38.

The process 500 begins in a block 505, in which the controller 46 performs diagnostics on various systems. The diagnostics can include, e.g., voltage cross checks on the DC/DC converters 44, the power-distribution boards 98, 100, 102, and the low-voltage batteries 38.

Next, in a block 510, the controller 46 determines whether the vehicle 30 passed the diagnostics. If the vehicle 30 did not pass the diagnostics, the process 500 proceeds to a block 515. If the vehicle 30 passed the diagnostics, the process proceeds to a decision block 520.

In the block 515, the controller 46 sets a diagnostic trouble code and prevents the vehicle 30 from movably operating. After the block 515, the process 500 ends.

In the decision block 520, the controller 46 determines whether the temperature of the low-voltage battery 38 is above a threshold temperature. The threshold temperature is chosen to be sufficiently warm that the low-voltage battery

38 can operate without damaging itself and can provide sufficient power, which temperature can be provided by manufacturer specification or determined experimentally. If the low-voltage battery 38 is below the threshold temperature, the process 500 proceeds to a block 525. If the low-voltage battery 38 is above the threshold temperature, the process 500 proceeds to a decision block 530.

In the block 525, the controller 46 instructs the respective DC/DC converter 44 to charge the low-voltage battery 38 with a charging regime that will generate heat in the low-voltage battery 38, e.g., high voltage and low current. After the block 525, the process 500 returns to the decision block 520 to check whether the low-voltage battery 38 is sufficiently heated.

In the decision block 530, the controller 46 determines whether the state of charge of the low-voltage battery 38 is above a charge threshold. The charge threshold is chosen so that the low-voltage battery 38 has sufficient charge remaining to perform the discharge of the low-voltage battery 38 described below with respect to a block 550, i.e., the charge threshold is greater than the discharge quantity in the block 550; e.g., the charge threshold is 75%. If the state of charge is above the charge threshold, the process 500 proceeds to a block 535. If the state of charge is below the charge threshold, the process 500 proceeds to a block 540.

In the block 535, the controller 46 instructs the respective DC/DC converter 44 to charge the low-voltage battery 38 to a preset level. The preset level is chosen so that the state of charge of the low-voltage battery 38 is above the charge threshold. The preset level can be a state of charge that the low-voltage battery 38 is charged to during normal operation, e.g., approximately 100%. After the block 535, the process 500 proceeds to the block 540.

In the block 540, the controller 46 sets a current threshold, which is used in a decision block 545 below. The current threshold is measured in units of electrical current, e.g., amperes. The current threshold is based on the temperature and voltage of the low-voltage battery 38. The memory of the controller 46 can store a lookup table with values for the current threshold associated with values for the temperature and voltage of the low-voltage battery 38. The values of the current threshold in the lookup table can be chosen to reflect the electrical current through the respective power-distribution board 98, 100, 102 when operating normally at the respective temperature and voltage of the low-voltage battery 38, which can be provided by manufacturer specifications or determined experimentally.

Next, in the decision block 545, the controller 46 determines whether the electrical current running through the respective power-distribution board 98, 100, 102 is below the current threshold. If the current is above the current threshold, the process 500 returns to the block 540. If the current is below the current threshold, the process 500 proceeds to the block 550.

Figure 7:
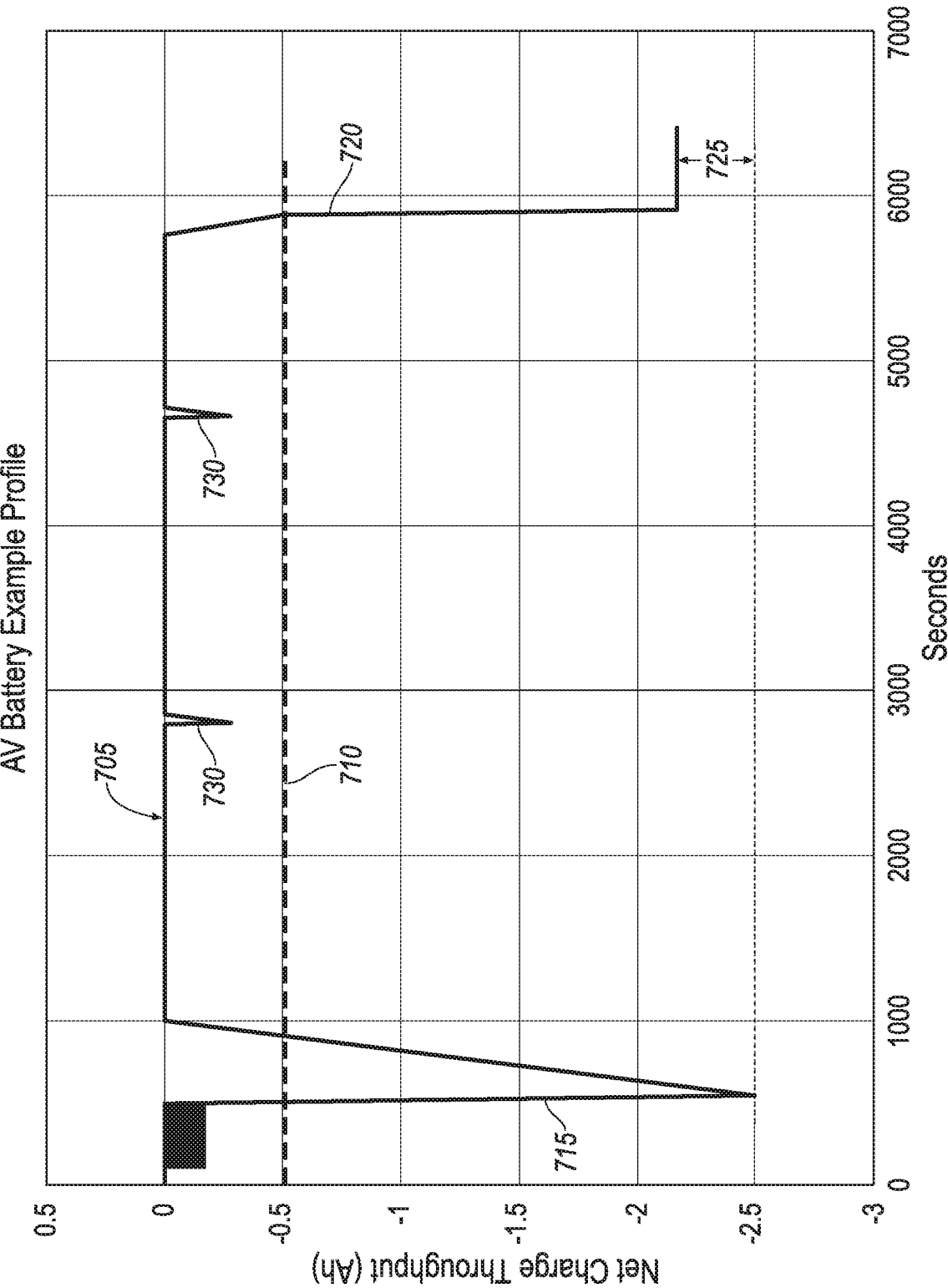
FIG. 7 is a plot of a depth of discharge of the battery over time.

In the block 550, the controller 46 reduces the voltage supplied by the power source 36, 40, 42, 44 to the loads 34 so that the battery 36, 38 discharges to supply power to the loads 34. In particular, the controller 46 reduces the voltage supplied by the respective DC/DC converter 44 to the respective power-distribution board 98, 100, 102 so that the low-voltage battery 38 discharges to supply power to the loads 34 connected to that power-distribution board 98, 100, 102. The state of charge 705 over time of the low-voltage battery 38 is plotted in FIG. 7. The amount and duration of the voltage reduction are chosen so that the resulting discharge brings the state of charge 705 below a state-of-charge (SoC) threshold 710, described below with respect to a block 610. The amount and duration of the voltage reduction are chosen so that the resulting pre-drive discharge 715 is greater than a charge necessary to perform the minimal risk condition (an MRC discharge 720); e.g., the pre-drive discharge 715 is equal to a sum of a buffer charge 725, the MRC discharge 720, and the battery capacity minus the SoC threshold 710. The buffer charge 725 can be chosen to compensate for changes to the charge to perform the minimal risk condition that can occur due to temperature, aging of the low-voltage battery 38, etc. For example, as shown in FIG. 7, the voltage reduction can result in a pre-drive discharge 715 that is a 200 ampere discharge of the low-voltage battery 38 for 45 seconds, i.e., 2.5 ampere-hours.

Next, in a block 555, the controller 46 tracks a plurality of electrical quantities during the discharge performed in the block 550. The electrical quantities can include a voltage of the respective power-distribution board 98, 100, 102; voltages of individual loads 34 such as the antilock-brake control module 64, the power-steering control modules 66, 68, or the autonomous-vehicle controller 48; and the voltage of the low-voltage battery 38.

Next, in a decision block 560, the controller 46 determines whether any of the electrical quantities are outside respective electrical-quantity ranges during the discharge. The electrical-quantity ranges are chosen to correspond to the respective electrical quantities when operating normally, i.e., chosen so that when a fault has occurred in the system 32, e.g., a partial or complete electrical short, during the pre-drive discharge, the respective electrical quantities will be outside the electrical-quantity ranges. Each electrical-quantity range includes an upper bound, a lower bound, or both an upper bound and a lower bound. An electrical quantity is outside the respective electrical-quantity range by being greater than the upper bound or less than the lower bound. The electrical-quantity ranges are stored in the memory of the controller 46. If any of the electrical quantities are outside the respective electrical-quantity range, the process 500 returns to the block 515 to prevent operation of the vehicle 30. If none of the electrical quantities are outside the respective electrical-quantity range, the process 500 proceeds to a block 565.

In the block 565, the controller 46 instructs the respective DC/DC converter 44 to recharge the low-voltage battery 38 to the preset level, as described above with respect to the block 535.

Next, in a block 570, the controller 46 stores in memory the time at which the pre-drive discharge occurred, for use in the block 405 above.

Next, in a block 575, the controller 46 permits the vehicle 30 to be movably operated. After the block 575, the process 500 ends.

Figure 6:
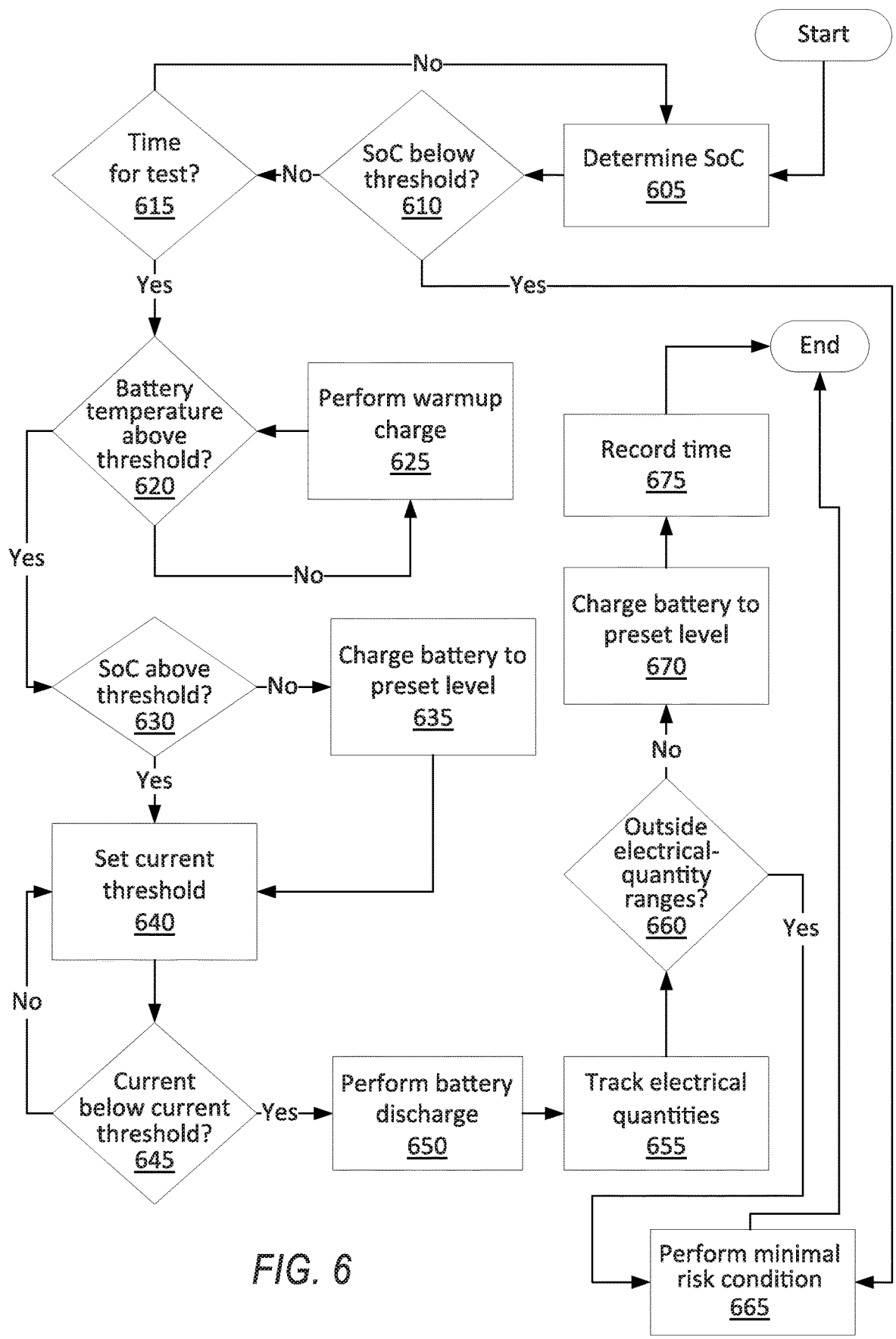
FIG. 6 is a process flow diagram of an example process for performing an after-start discharge test of the battery.

FIG. 6 is a process flow diagram illustrating an exemplary process 600 for performing an after-start discharge test of a battery 36, 38 of the power-distribution system 96. The memory of the controller 46 stores executable instructions for performing the steps of the process 600. As a general overview of the process 600, the controller 46 performs the minimal risk condition if the state of charge falls below the SoC threshold; periodically tracks electrical quantities of the system 32 while reducing a voltage supplied by the power source 36, 40, 42, 44 to the loads 34 so that the battery 36, 38 discharges to supply power to the loads 34; and performs the minimal risk condition or permits the vehicle to continue movably operating in response to the relationship of the electrical quantities to electrical-quantity ranges. The controller 46 reduces the voltage supplied by the power source 36, 40, 42, 44 until the state of charge of the battery 36, 38 is at a level above the SoC threshold. The process 600 occurs while the vehicle 30 is movably operating.

The process 600 can be performed for all the low-voltage batteries 38 or for a subset of the low-voltage batteries 38, such as for the lithium-ion low-voltage batteries 38 connected to the primary power-distribution board 100 and the secondary power-distribution board 102 but not the lead-acid low-voltage battery 38 connected to the base power-distribution board 98. For example, the process 600 can be performed for a subset of the low-voltage batteries 38 if the loads 34 necessary to perform a minimal risk condition are arranged on a subset of the power-distribution boards 98, 100, 102. The process 600 is performed independently for each low-voltage battery 38.

The process 600 begins in a block 605, in which the controller 46 determines the state of charge of the low-voltage battery 38. The state of charge can be determined by the controller 46 based on known relationships using various sensor data about the low-voltage battery 38, e.g., current flow, temperature, etc.

Next, in a decision block 610, the controller 46 determines whether the state of charge of the low-voltage battery 38 falls below the SoC threshold. The SoC threshold is chosen to be below a state of charge after typical discharges of the low-voltage battery 38 during normal operation of the vehicle 30, which can be determined experimentally, but sufficiently large that the low-voltage battery 38 has sufficient remaining charge for an MRC discharge plus the buffer charge, i.e., sufficiently large that the vehicle 30 can perform the minimal risk condition, e.g., the capacity minus 0.5 ampere-hours. In response to the state of charge of the low-voltage battery 38 being above the SoC threshold, the process 600 proceeds to a decision block 615. In response to the state of charge falling below the SoC threshold, the process 600 proceeds to a block 655.

In the decision block 615, the controller 46 determines whether to perform the after-start discharge test. The after-start discharge test is performed periodically, i.e., once every period of time, e.g., every 30 minutes. The controller 46 calculates the current time minus the time of the previous after-start discharge test (or the pre-driving discharge test if more recent). If the time since the last discharge test is less than the period, the process 600 returns to the block 605 to continue monitoring the state of charge of the low-voltage battery 38. If the time since the last discharge test is greater than the period, the process 600 proceeds to a decision block 620.

In the decision block 620, the controller 46 determines whether the temperature of the low-voltage battery 38 is above a threshold temperature, as described above with respect to the block 520. If the low-voltage battery 38 is below the threshold temperature, the process 600 proceeds to a block 625. If the low-voltage battery 38 is above the threshold temperature, the process 600 proceeds to a decision block 630.

In the block 625, the controller 46 instructs the respective DC/DC converter 44 to charge the low-voltage battery 38 with a charging regime that will generate heat in the low-voltage battery 38, e.g., high voltage and low current. After the block 625, the process 600 returns to the decision block 620 to check whether the low-voltage battery 38 is sufficiently heated.

In the decision block 630, the controller 46 determines whether the state of charge of the low-voltage battery 38 is above a charge threshold. The charge threshold is chosen so that the low-voltage battery 38 has sufficient charge remaining to perform the discharge of the low-voltage battery 38 described below with respect to a block 650 while not falling below the SoC threshold. The charge threshold can be the same or different than the charge threshold described above with respect to the decision block 530. If the state of charge is below the charge threshold, the process 600 proceeds to a block 635. If the state of charge is above the charge threshold, the process 600 proceeds to a block 640.

In the block 635, the controller 46 instructs the respective DC/DC converter 44 to charge the low-voltage battery 38 to a preset level, as described above with respect to the block 535. After the block 635, the process 600 proceeds to the block 640.

In the block 640, the controller 46 sets the current threshold, as described above with respect to the block 540.

Next, in the decision block 645, the controller 46 determines whether the electrical current running through the respective power-distribution board 98, 100, 102 is below the current threshold. If the current is above the current threshold, the process 600 returns to the block 640. If the current is below the current threshold, the process 600 proceeds to the block 650.

In the block 650, the controller 46 reduces the voltage supplied by the power source 36, 40, 42, 44 to the loads 34 so that the battery 36, 38 discharges to supply power to the loads 34. In particular, the controller 46 reduces the voltage supplied by the respective DC/DC converter 44 to the respective power-distribution board 98, 100, 102 so that the low-voltage battery 38 discharges to supply power to the loads 34 connected to that power-distribution board 98, 100, 102. The state of charge 705 of the low-voltage battery 38 is plotted over time in FIG. 7. The amount and duration of the voltage reduction are chosen so that the resulting after-start discharge 730 reaches a level above the SoC threshold 710, described above with respect to the block 610. For example, as shown in FIG. 7, the voltage reduction can result in an after-start discharge 730 that is a 100 ampere discharge of the low-voltage battery 38 for 9 seconds, i.e., 0.25 ampere-hours.

Next, in a block 655, the controller 46 tracks the plurality of electrical quantities during the discharge performed in the block 650, as described above with respect to the block 555.

Next, in a decision block 660, the controller 46 determines whether any of the electrical quantities are outside respective electrical-quantity ranges during the discharge. The electrical-quantity ranges are chosen to correspond to the respective electrical quantities when operating normally, i.e., chosen so that when a fault has occurred in the system 32, e.g., a partial or complete electrical short, during the after-start discharge, the respective electrical quantities will be outside the electrical-quantity ranges, as determined by reproducing types of faults experimentally or in simulations. Each electrical-quantity range includes an upper bound, a lower bound, or both an upper bound and a lower bound. An electrical quantity is outside the respective electrical-quantity range by being greater than the upper bound or less than the lower bound. The electrical-quantity ranges are stored in the memory of the controller 46. The electrical-quantity ranges can be the same or different as the electrical-quantity ranges described above with respect to the decision block 560. If any of the electrical quantities are outside the respective electrical-quantity range, the process 600 proceeds to the block 665. If none of the electrical quantities are outside the respective electrical-quantity range, the process 600 proceeds to a block 670.

In the block 665, the controller 46 performs the minimal risk condition. The controller 46 can instruct the autonomous-vehicle controller 48 to perform the minimal risk condition. The autonomous-vehicle controller 48 may perform the minimal risk condition by using known autonomous-operation algorithms. For example, the minimal risk condition may be initiating a handover to the human driver or autonomously driving the vehicle 30 to a halt at a roadside, i.e., stopping the vehicle 30 outside active lanes of traffic.

In the block 670, the controller 46 instructs the respective DC/DC converter 44 to recharge the low-voltage battery 38 to the preset level, as described above with respect to the block 535.

Next, in a block 675, the controller 46 stores in memory the time at which the after-start discharge occurred, for use in the block 615 above. After the block 675, the process 600 ends.

FIG. 7 shows exemplary effects of the processes 500 and 600 on the state of charge 705 of the low-voltage battery 38 over time. The value of the state of charge 705 is shown relative to the capacity of the low-voltage battery 38; i.e., the low-voltage battery 38 is fully charged at zero amperehours, and negative values represent how far below the capacity the state of charge 705 is. The pre-drive discharge 715 performed in the block 550 occurs after other pre-drive checks such as in the blocks 505-545, e.g., at 500 seconds. The low-voltage battery 38 is then recharged back up to the preset level 735, which is equal to the capacity of the low-voltage battery 38, represented as 0, in the block 565, ending at 1000 seconds. The after-start discharge 730 then occurs 30 minutes after the pre-drive discharge 715, at 2800 seconds, and then again 30 minutes after the first after-start discharge 730, at 4600 seconds, as described above in the block 650. The low-voltage battery 38 is recharged back up to the preset level 735 after each after-start discharge 730, as described above with respect to the block 670. As an example of an unintended fault, starting at approximately 5700 seconds, the state of charge 705 decreases from the preset level 735 to the SoC threshold 710, triggering the minimal risk condition, as described in the blocks 610, 665.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages, technologies, and/or standards, including, without limitation, and either alone or in combination, AUTOSAR, Vector CAN drivers, Java™, C, C++, Matlab, Simulink, Stateflow, Visual Basic, Java Script, Python, Perl, HTML, proprietary drivers, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
a load in a vehicle;
a battery electrically connected to the load;
a power source electrically connected to the load; and
a computer communicatively connected to the power source;
wherein the computer is programmed to:
reduce a voltage supplied by the power source to the load so that the battery discharges to supply power to the load;
then, in response to an electrical quantity of the system being outside an electrical-quantity range while the battery is discharging, perform a minimal risk condition or prevent the vehicle from movably operating; and
after reducing the voltage supplied by the power source, in response to the electrical quantity of the system being within the electrical-quantity range while the battery is discharging, permit the vehicle to be movably operated.

2. The system of claim 1, wherein the battery is a low-voltage battery.

3. The system of claim 1, wherein the power source is a DC/DC converter supplied by a high-voltage battery.

4. The system of claim 1, wherein the electrical quantity is one of a voltage of the load or a voltage of the battery.

5. The system of claim 1, wherein the computer is further programmed to, while the vehicle is movably operating, perform a minimal risk condition in response to a state of charge (SoC) of the battery falling below a SoC threshold.

6. The system of claim 5, wherein the computer is further programmed to reduce the voltage supplied by the power source so that the state of charge of the battery falls below the SoC threshold.

7. The system of claim 6, wherein the computer is further programmed to reduce the voltage supplied by the power source only while the vehicle is not movably operating.

8. The system of claim 6, wherein the computer is further programmed to reduce the voltage supplied by the power source until the discharge by the battery is greater than a charge to perform the minimal risk condition.

9. The system of claim 5, wherein the computer is further programmed to reduce the voltage supplied by the power source until the state of charge of the battery is at a level above the SoC threshold.

10. The system of claim 9, wherein the computer is further programmed to reduce the voltage supplied by the power source periodically.

11. The system of claim 9, wherein the computer is further programmed to reduce the voltage supplied by the power source while the vehicle is movably operating.

12. The system of claim 11, wherein the computer is further programmed to:
while the vehicle is not movably operating, reduce a voltage supplied by the power source to the load so that the battery discharges to supply power to the load so that the state of charge of the battery falls below the SoC threshold; and
then, in response to the electrical quantity of the system being outside the electrical-quantity range while the battery is discharging, prevent the vehicle from movably operating.

13. The system of claim 1, wherein
the load is a first load;
the electrical quantity is a voltage of the first load; and
the electrical-quantity range is a first voltage range;
the system further comprising a second load electrically connected to the battery and to the power source;
wherein the computer is further programmed to, after reducing the voltage supplied by the power source, in response to a voltage of the second load being outside a second voltage range while the battery is discharging, perform a minimal risk condition or prevent the vehicle from movably operating.

14. A system comprising:
a load in a vehicle;
a battery electrically connected to the load;
means to control power supplied to the load;
means to one of perform a minimal risk condition or prevent the vehicle from movably operating in response to an electrical quantity of the system being outside an electrical-quantity range while the battery is supplying power to the load due to a reduced voltage from the means to supply power to the load; and
means to permit the vehicle to be movably operated in response to the electrical quantity of the system being within the electrical-quantity range while the battery is supplying power to the load due to the reduced voltage from the means to supply power to the load.

15. A computer comprising a processor and a memory storing instructions executable by the processor to:
reduce a voltage supplied by a power source to a load so that a battery discharges to supply power to the load;
then, in response to an electrical quantity of one of the battery or the load being outside an electrical-quantity range while the battery is discharging, prevent a vehicle from movably operating or perform a minimal risk condition; and
after reducing the voltage supplied by the power source, in response to the electrical quantity of the system being within the electrical-quantity range while the battery is discharging, permit the vehicle to be movably operated.

16. The computer of claim 15, wherein the instructions further include instructions to, while the vehicle is movably operating, perform a minimal risk condition in response to a state of charge (SoC) of the battery falling below a SoC threshold.

17. The computer of claim 16, wherein the instructions further include instructions to reduce the voltage supplied by the power source until the state of charge of the battery falls below the SoC threshold.

18. The computer of claim 17, wherein the instructions further include instructions to reduce the voltage supplied by the power source only while the vehicle is not movably operating.

19. The computer of claim 16, wherein the instructions further include instructions to reduce the voltage supplied by the power source until the state of charge of the battery is at a level above the SoC threshold.

20. The computer of claim 19, wherein the instructions further include instructions to reduce the voltage supplied by the power source periodically.

* * * * *